United States Patent [19]

Kihara

[11] Patent Number: 5,432,912
[45] Date of Patent: Jul. 11, 1995

[54] METHOD AND CHANNEL APPARATUS FOR REARRANGING RECEIVED DATA IN ORDER OF GENERATION OF ADDRESSES

[75] Inventor: Jyunichi Kihara, Tachikawa, Japan

[73] Assignee: Kabushiki Kaisha Toshiba, Kawasaki, Japan

[21] Appl. No.: 77,958

[22] Filed: Jun. 18, 1993

Related U.S. Application Data

[63] Continuation of Ser. No. 921,603, Aug. 3, 1992, abandoned, which is a continuation of Ser. No. 399,939, Aug. 29, 1989, abandoned.

[30] Foreign Application Priority Data

Aug. 31, 1988 [JP] Japan ............................. 63-216812

[51] Int. Cl.$^6$ .................................................. G06F 13/00
[52] U.S. Cl. .................................... 395/275; 395/425; 364/DIG. 1; 364/238.3; 364/243; 364/246; 364/246.4; 364/254; 364/254.2; 364/260.4
[58] Field of Search ........................ 395/275, 325, 425

[56] References Cited

U.S. PATENT DOCUMENTS

| | | | |
|---|---|---|---|
| 4,272,815 | 6/1981 | Kadowaki et al. | 364/200 |
| 4,346,439 | 8/1982 | Huno et al. | 364/200 |
| 4,354,231 | 10/1982 | Carlsson et al. | 364/200 |
| 4,598,362 | 7/1986 | Kinjo et al. | 364/200 |
| 4,914,575 | 4/1990 | Kihara et al. | 346/200 |

FOREIGN PATENT DOCUMENTS 62-256065 11/1987 Japan .
63-56754 3/1988 Japan .

*Primary Examiner*—Kevin A. Kriess
*Assistant Examiner*—Kakali Chaki
*Attorney, Agent, or Firm*—Cushman, Darby & Cushman

[57] ABSTRACT

Where memory read requests are consecutively issued from a channel apparatus, read data and within-device identifiers in response information, which are returned from a memory control device of a main memory in order which does not always correspond to the order of requests, are stored in a receive buffer. The information is taken from the receive buffer in sequence. The within-device identifier in the information taken from the receive buffer corresponds to n low-order bits of a memory address of the main memory for the corresponding read data. The corresponding read data is stored in a transmit buffer using the within-device identifier as the lower address of the transmit buffer. Thus, read data are rearranged in the transmit buffer in the order of generation of memory addresses.

15 Claims, 9 Drawing Sheets

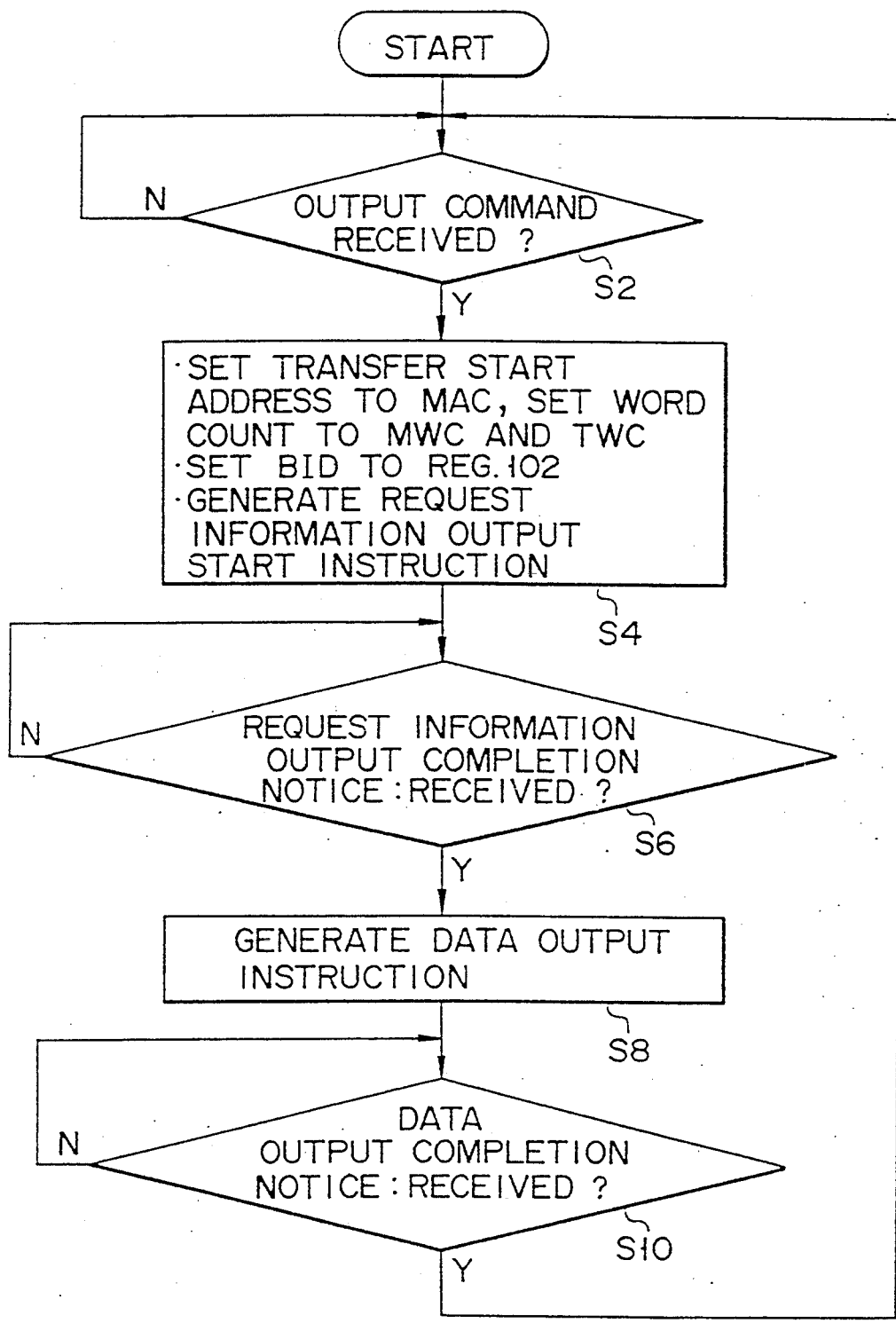
F I G. 3A

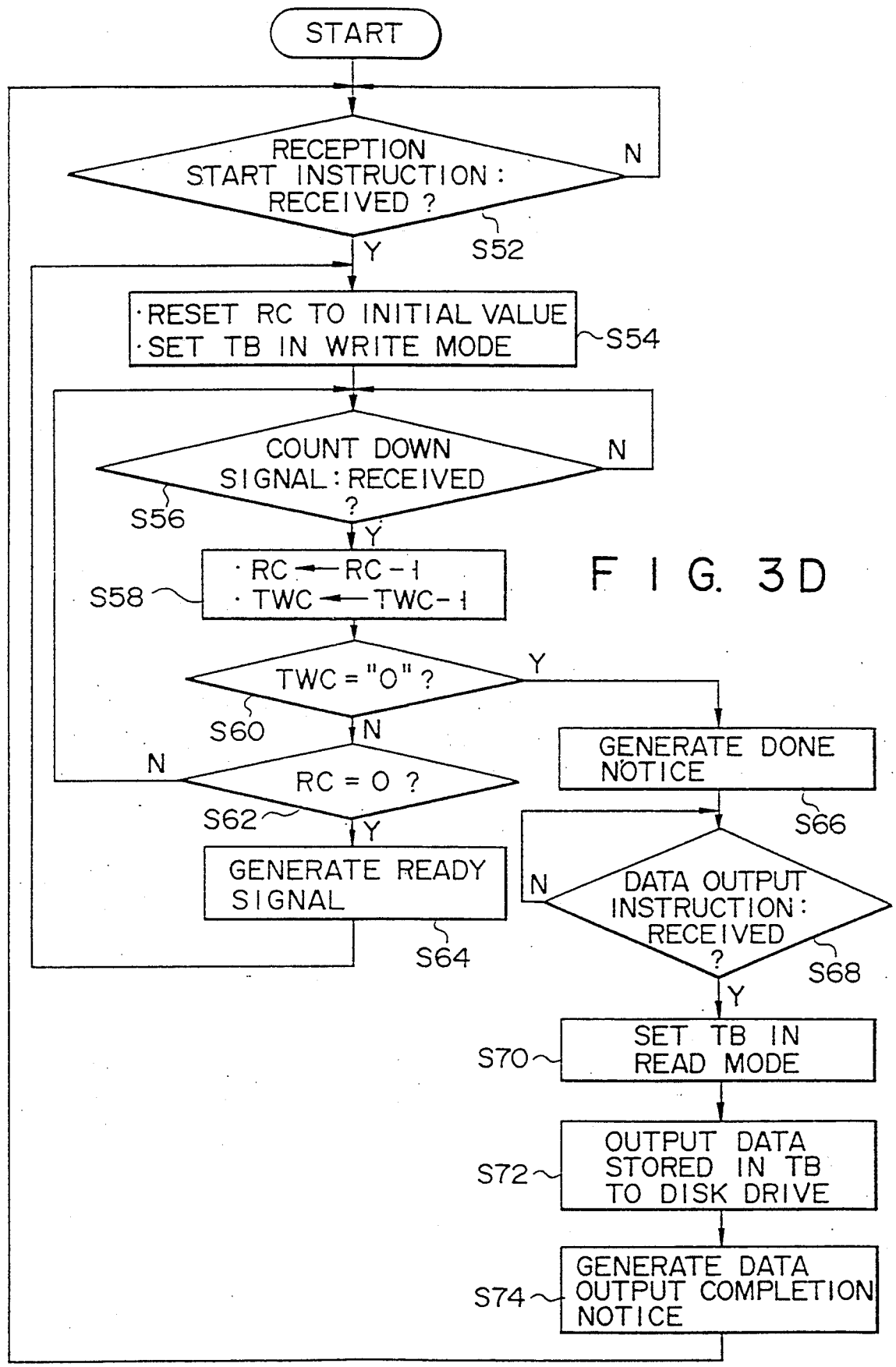
F I G. 3D

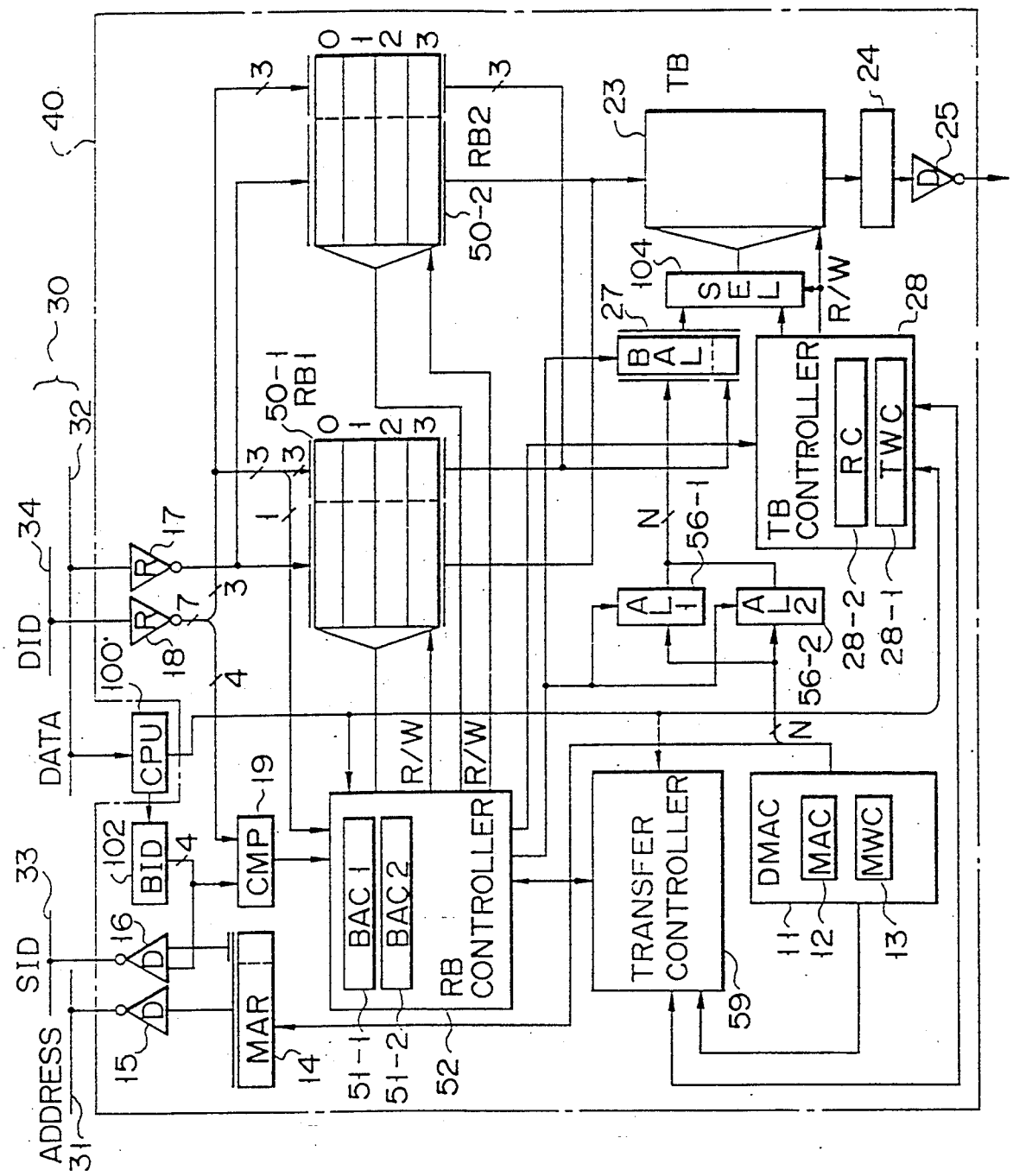
F I G. 4

METHOD AND CHANNEL APPARATUS FOR REARRANGING RECEIVED DATA IN ORDER OF GENERATION OF ADDRESSES

This is a continuation of application Ser. No. 07/921,603, filed on Aug. 3, 1992, which was abandoned upon the filing hereof, which is a continuation of application Ser. No. 07/399,939, filed on Aug. 29, 1989, now both abandoned.

BACKGROUND OF THE INVENTION

1. Field of the Invention

The present invention relates to a method and a channel apparatus for rearranging received read data in order of generation of addresses, which are used with a split bus control system in which, at a time of memory read, transmission of memory read request information containing a memory address and a source identifier designating a requesting source and transmission of response information containing read data and a destination identifier corresponding to the source identifier are carried out separately.

2. Description of the Related Art

With a conventional data processing system for the so-called split bus control system, a main storage device is directly connected to a high-speed input/output device, such as a magnetic disk unit, and is connected through a channel apparatus to a clock synchronous system bus. The main storage device comprises a memory control unit and a plurality of memory banks, and the memory control unit generally allows interleaved operation of the memory banks for improved performance. Data is transmitted between the input/output device and the main storage device via the channel unit in data block or word units and memory addresses used for accessing the main storage device are updated in ascending order. In the split bus control system, in a memory read mode, the transmission of memory read request information from the input/output device and the transmission of response information from the main memory for the request information are separated from each other. That is, the request information and the response information are not consecutive. The memory read request information includes a memory address and a source identifier SID designating a request source. The response information includes read data and a destination identifier DID designating the destination of the corresponding response. As the DID of the response information the SID of the corresponding memory read request information is used. The read data contained in the response information will be entered into a channel unit to which the same SID as the DID is assigned.

In a conventional data processing system as described above, there is a need for an improvement in data transmission rate. As a measure to increase the data transmission rate, after the issue of memory read request information from a channel unit to the main storage device the next memory read request information could be issued before the return of response information containing read data for the previous request. However, since the memory control device of the main memory device first processes memory read request information addressed to a memory bank which is not busy, there is no assurance that responses are returned in the order of generation of request information, depending upon the states of the memory banks. Hence, where read data in the response information returned from the memory control device are stored in sequence in a data buffer, the arrangement of the read data may often be out of order of generation of the memory read request information. For this reason, the memory read request information cannot thus be issued consecutively and, as a result, the memory read operation cannot be sped.

SUMMARY OF THE INVENTION

It is accordingly an object of the present invention to provide a method and a channel apparatus which permit consecutive issue of memory read requests and easy rearrangement of read data contained in response information having no assurance of return in the order of issue of the memory read requests, thereby to speed up memory read operation.

To attain the object, a channel apparatus in a data processing system comprises:

a controller responsive to an output command input thereto, for generating a transfer instruction;

a request information generating section responsive to the transfer instruction from the controller and an input ready signal, for generating a predetermined number of request information while updating addresses, the predetermined number of request information being generated consecutively in turn, each of the predetermined number of request information being determined by the transfer instruction from the controller and comprising an address and a source identifier, and the source identifier comprising a device identifier and a within-device identifier; and a data transfer section for sequentially receiving response information entered in response to the request information generated from the request information generating section, each of the response information comprising data and a destination identifier corresponding to the source identifier of corresponding request information, rearranging data in the received response information in the order of generation of the request information according to the within-device identifiers when the predetermined number of response information are received, and generating and outputting the ready signal to the request information generating section when the rearranging of data is completed.

To attain the object, a method of rearranging data in the order of generation of request information comprises the steps of:

generating a start instruction in response to an output instruction;

generating a predetermined number of request information in response to the start instruction and a ready signal while updating addresses, the predetermined number of request information being generated consecutively in turn, each of the request information being determined by the start instruction and including an address and a source identifier which includes a device identifier and a within-device identifier;

sequentially storing data and source identifiers in response information responding to the generated request information in receive buffer means according to the source identifiers, the response information including the data and the destination identifiers which corresponds to the source identifiers;

reading the data and the within-device identifiers sequentially from the receive buffer means when the predetermined number of data and device identifiers are stored in the receive buffer means;

rearranging the data in the order of generation of the request information according to the within-device identifiers to store the rearranged data in transmit buffer means; and generating the ready signal.

According to the channel apparatus of the present invention, as described above, memory read request information can be issued consecutively, and moreover read data, which do not always return in order of requests, can readily be rearranged in ascending order of addresses, thus speeding up reading of a memory in the channel apparatus.

BRIEF DESCRIPTION OF THE DRAWINGS

FIGS. 3A through 3D are flowcharts illustrating the operation of the first embodiment;

FIG. 4 is a block diagram illustrating a second embodiment of the channel apparatus of the present invention.

DETAILED DESCRIPTION OF THE PREFERRED EMBODIMENTS

Figure 1:
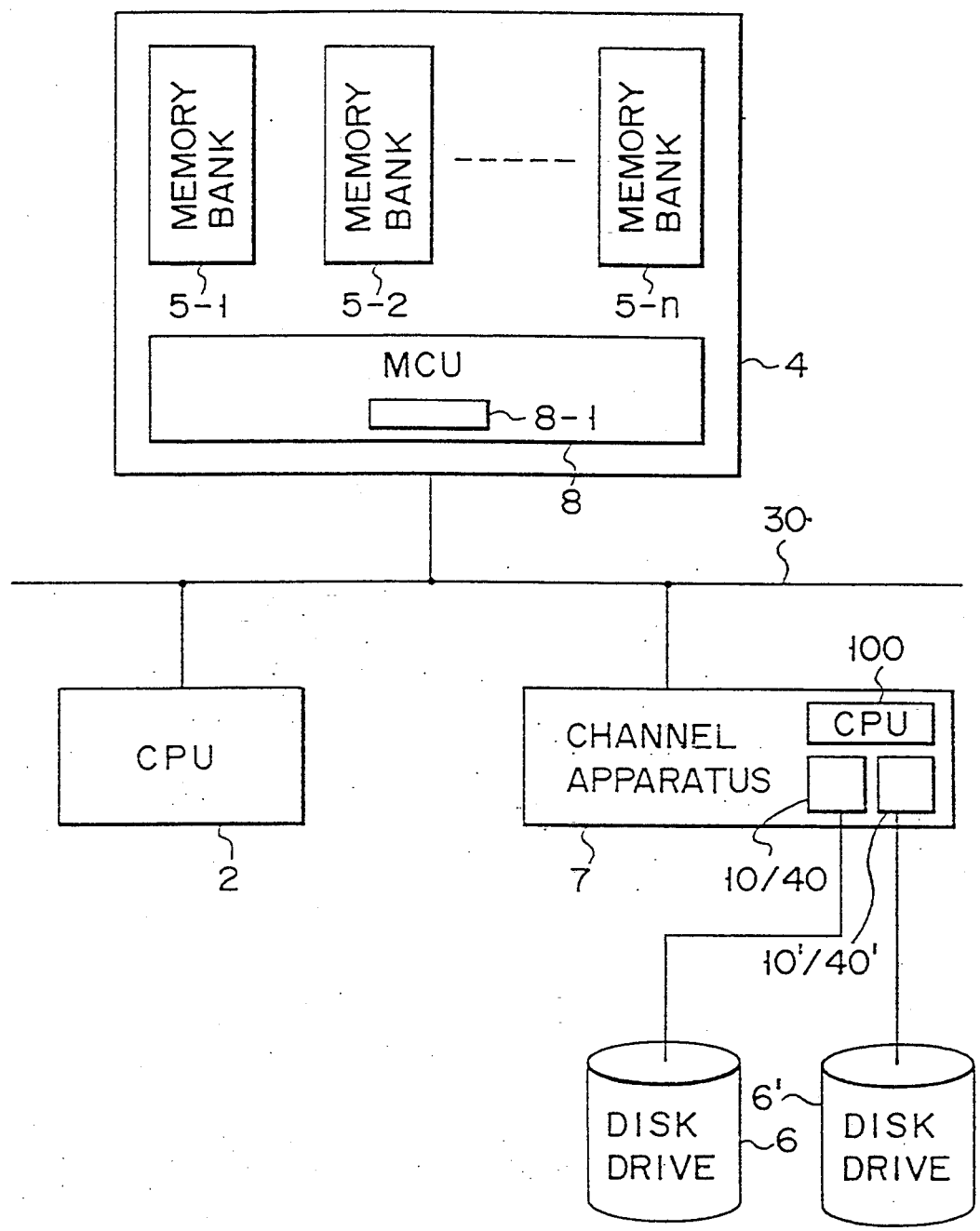
FIG. 1 is a schematic diagram of a data processing system to which a channel apparatus according to the present invention is applied.

Referring now to FIG. 1, an arrangement of a data processing system to which a channel apparatus according to the present invention is applied will be described below. In FIG. 1, a central processing unit (CPU) 2, a main storage device 4, and a channel apparatus 7 including a CPU 100 and data transfer sections 10/40 and 10'/40' of the present invention are connected to clock synchronous system bus 30. Since sections 10/40 and 10'/40' are the same, only section 10/40 will be described below. System bus 30 is of a split bus control type. The system bus 30 comprises, with reference of FIGS. 2 and 4, an address bus 31 used for transferring memory addresses, a data bus 32 used for transferring data, a source identifier (SID) bus 33 used for transferring SIDs and a destination identifier (DID) bus 34 used for transferring DIDs. The SID and DID are each 7 bits in length and include a device identifier in the 4 high-order bits and a within-device identifier in the 3 low-order bits, for example.

Disk drive units 6 and 6' are connected to the channel apparatus 7. The channel apparatus 7 generates memory read request information in sequence in response to an output command from CPU 2 and transmits the generated request information to the main storage device 4 via the system bus 30. The memory read request information contains a memory address of the main storage device 4 to be the accessed and a DID. The channel apparatus 7 receives response information output from the main storage device 4 onto system bus 30 in response to the memory read request information. The response information contains read data and an SID. The channel apparatus 7 rearranges received read data in the order of generation of the memory read request information and outputs the rearranged data to the disk drive unit 6 or 6'.

The main storage device 4 comprises a memory control unit MCU 8 and n memory banks 5-l to 5-n. The memory banks 5-l to 5-n are interleave controlled in word units by MCU 8. MCU 8 has a register 8-l and keeps therein the DID contained in the memory read request information. The MCU 8 accesses one of the memory banks in accordance with a memory address contained in the request information to read data therefrom. Response information containing the read data and the identifier kept in register 8-l is transmitted to the channel apparatus 7 over system bus 30. Namely, the DID is transmitted as the SID.

Figure 2:
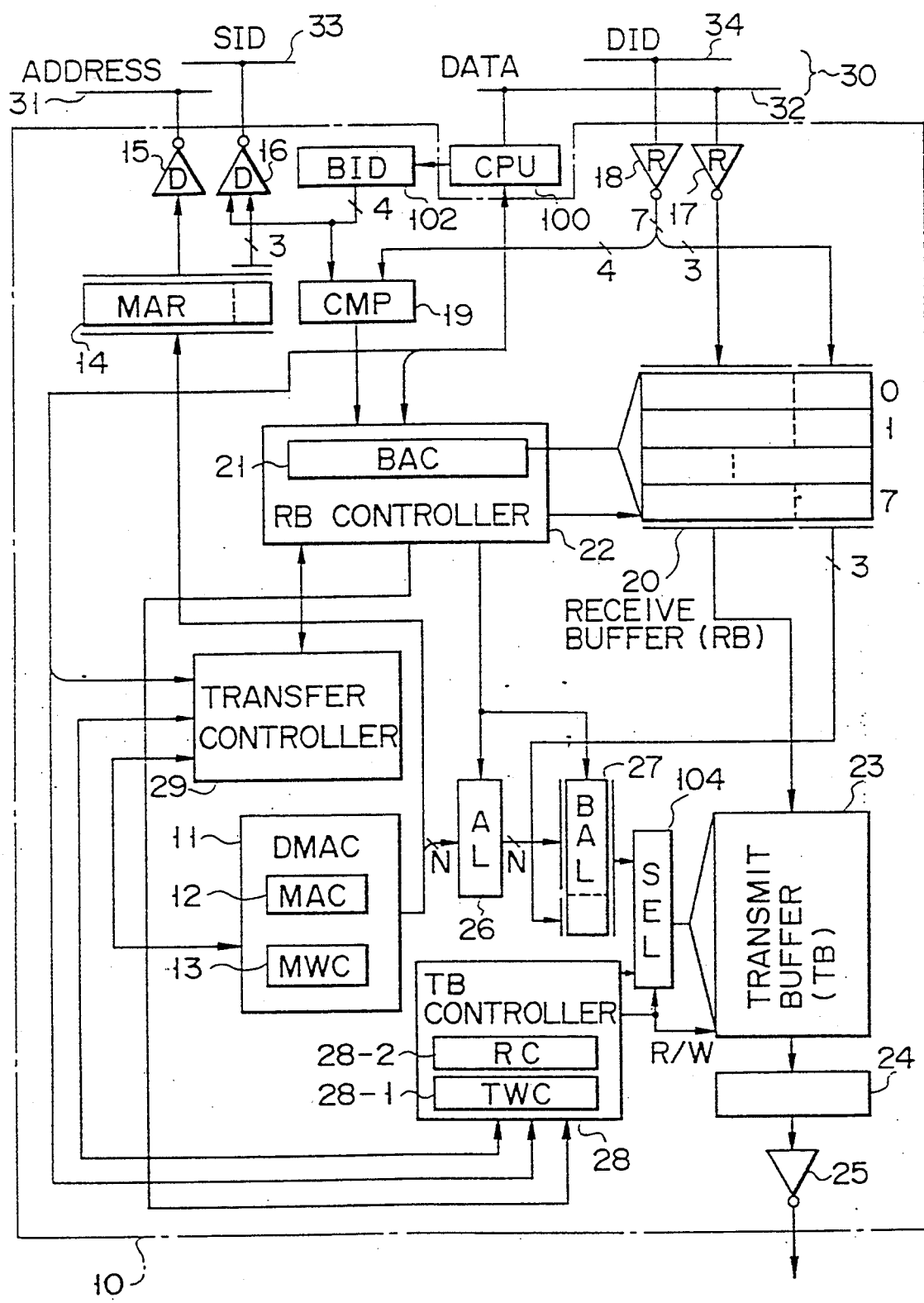
FIG. 2 is a block diagram illustrating a first embodiment of the channel apparatus of the present invention.

Referring to FIG. 2, there is illustrated a detailed arrangement of a first embodiment of the channel apparatus 7 including the data transfer section 10 according to the present invention. CPU 100 receives an output command transmitted from CPU 2 (FIG. 1) over system bus 30 and loads a device identifier BID contained in the command into a register 102 in accordance with a least significant bit (LSB) of the BID. The LSB of the BID represents the disk drive unit 6 or 6' to which data is to be output and the remaining bits of the BID represent the channel apparatus 7. In response to the output command, CPU 100 issues a request information output start instruction to a transfer controller 29. Furthermore, when data are read and rearranged, the CPU 100 issues a data output instruction to a TB controller 28 so as to output the read data to disk drive unit 6 or 6'.

Responsive to the request information output start instruction from CPU 100, the transfer controller 29 controls a DMA controller (DMAC) 11 to generate the read memory addresses of the main storage device 4, and generates and outputs a receive start instruction to the RB and TB controllers 21 and 28. DMAC 11 has a memory address counter MAC 12 and a memory word counter MWC 13 and generates read memory addresses in sequence to control the DMA transfer in word units. A transfer starting memory address and the number of words to be transferred are set in the MAC 12 and MWC 13, respectively. The memory address in MAC 12 is incremented by one each time memory read request information is generated, while the number of words in MWC 13 is decremented by one each time the memory read request information is generated.

An address register MAR 14 receives and holds the memory address from the DMAC 11. The address held by the address register MAR 14 is supplied onto the address bus 31 through a driver (D) 15. The three low-order bits of the memory address held by the register are supplied to a driver (D) 16 as a within-device identifier, or an address identifier AID. The driver 16 concatenates the address identifier AID from register MAR 14 with the 4-bit device identifier BID held in the register 102. The concatenated 7-bit information is sent onto the SID bus 33 as an SID. The memory address and SID are sent to the main storage device 4 as the memory read request information.

A receive buffer (RB) 20 has a storage capacity of, for example, eight words and stores pairs of read data RD and AID that are contained in the destination identifier DID. The RB controller 22 has a 3-bit buffer address counter (BAC) 21. The BAC 21 designates an address of the RB buffer 20 while updating its contents. Responsive to the receive start instruction from the transfer controller 29, the RB controller 22 controls buffer RB 20 for its operation mode (read/write mode) and the BAC 21 to be counted up. The initial value of the BAC 21 is designated by the transfer controller 29. Upon the termination of transfer of received read data to TB 23 or when the RB 20 is empty, the RB controller 22 provides a ready signal to the transfer controller 29.

When response information is output from the main storage device 4, a receiver (R) 17 receives read data on a data bus 32 and provides it to the RB 20. A receiver R 18 receives the DID in the response information from destination identifier (DID) bus 34 and provides a device identifier CID and the address identifier AID in the received DID to a comparator (CMP) 19 and the RB 20, respectively. The comparator (CMP) 19 compares the CID from the receiver 18 with the BID held by the register 102 and produces a coincidence signal when a coincidence occurs, which is applied to the RB controller 22. Responsive to the coincidence signal, the RB controller 22 stores the read data and the AID in the locations of the RB 20 which are designated by the BAC 21. When up to eight pairs of read data and AID are stored, the RB controller 22 sets the RB 20 in read mode, with the result that the pairs of the read data and the AID designated by the BAC 21 are read out in sequence from the RB 20, the read data and the AID being applied to a transmit buffer (TB) 23 and register 27, respectively.

The TB 23 stores read data from the RB 20. The TB controller 28 has counters TWC 28-1 and RC 28-2 and is responsive to the receive start instruction from the transfer controller 29 to set TB 23 in write mode. The RC 28-2 counts the number of read data entered during one transfer cycle and provides a ready signal to the transfer controller 29 when the read data reaches initial value of the transfer cycle. The TWC 28-1 has its initial value set by the CPU 100 and is decremented by one each time one read data is stored in TB 23. When the TWC 28-1 is counted down to 0, the TB controller 28 provides to the transfer controller 29 a DONE notice indicating that all the read data are stored in the TB 23. Responsive to a data output instruction from the CPU 100, the TB controller 28 sets the TB 23 in read mode and generates read addresses to access the TB 23 to read data therefrom. A register 24 holds data read from the TB 23. A driver (D) 25 sends the read data held in the register 24 to the disk drive unit 6.

An address latch (AL) 26 is responsive to a control signal from the RB controller 22 to latch a memory address designated by the MAC 12 except the three low-order bits thereof. A buffer address latch (BAL) 27 holds an address for the TB 23. The BAL 27 is responsive to a control signal from the RB controller 22 to latch an AID from the RB 20 in its three low-order bit positions and the address held by the AL 26 in the remaining high-order bit positions for delivery to a selector (SEL) 104. The SEL 104 supplies one of the addresses from the BAL 27 and the TB controller 28 to the TB 23. Responsive to a mode control signal from the TB controller 28, the SEL 104 selects the address from the BAL 27 when the TB 23 is in the write mode or the address from the TB controller 28 when the TB 23 is in the read mode.

The operation of the first embodiment of the channel apparatus according to the present invention will now be described with reference to FIGS. 3A though 3D.

First, the CPU 100 of the channel apparatus 7 waits in step S2 of FIG. 3A for the generation of an output command from the CPU 2. When data stored in the main storage device 4 needs to be stored in the disk drive unit 6, the CPU 2 issues an output command to the channel apparatus 7. Receiving the output command, the CPU 100 checks if the transfer controller 29 is busy. If so, the CPU 100 waits until the transfer controller 29 is not busy. When the transfer controller 29 leaves the busy state, CPU 100 sets, in step S4, a transfer starting address of the main storage device in the MAC 12 of the DAC 11 and the number of words to be transferred in the MWC 13 and the TWC 28-1 of the TB controller 28. Also, the device identifier BID contained in the output command is loaded into the register 102 in accordance with an LSB of the BID. Subsequently, a request information output start instruction is generated and applied to the transfer controller 29. Thereafter, the CPU 100 waits for a request information output completion signal to be entered, in step S6.

Figure 3B:
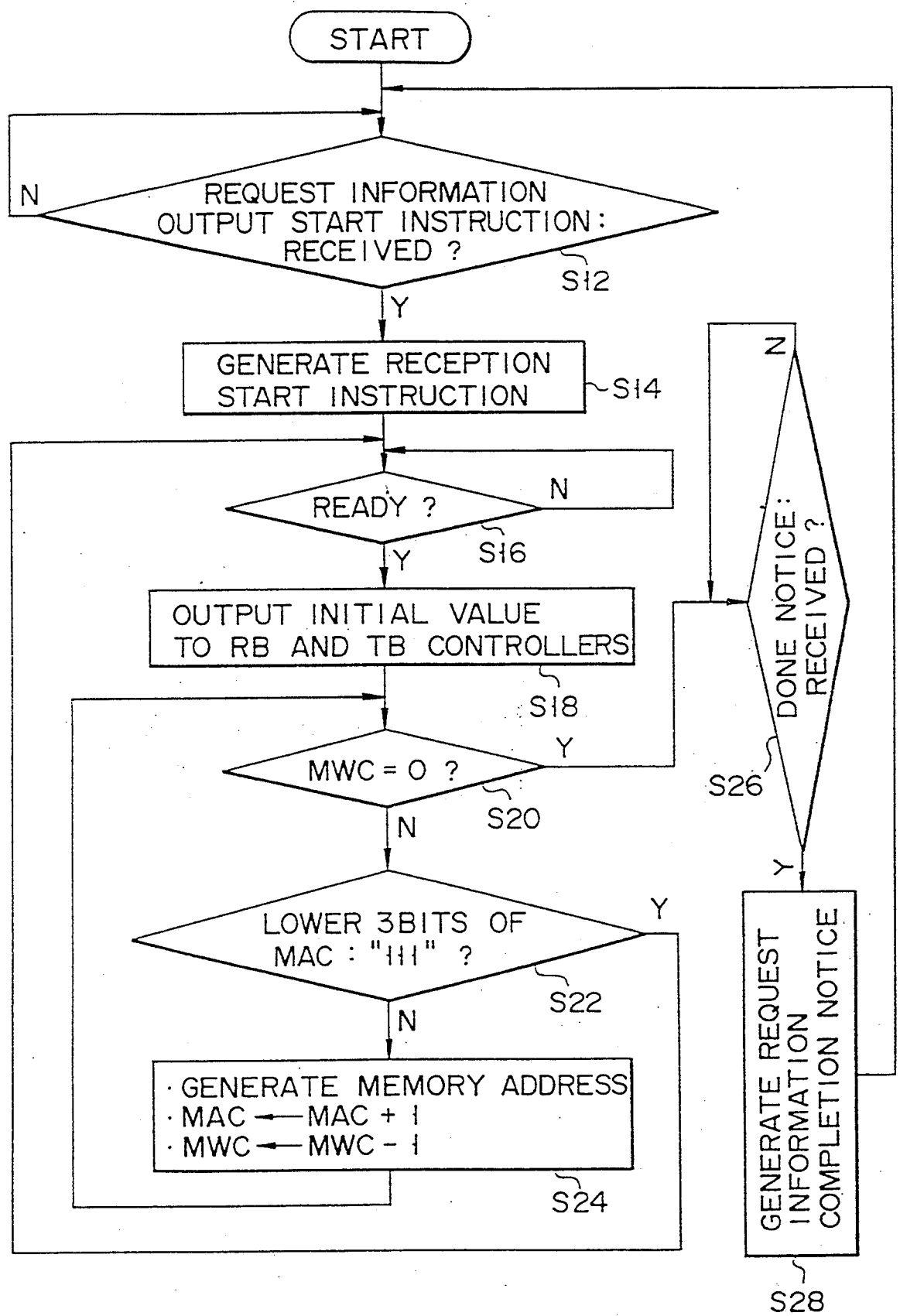

In step S12 of FIG. 3B, the transfer controller 29 waits for the request information output start instruction to be entered. When the request information output start instruction is entered, the transfer controller 29 generates and provides the receive start instruction to the RB controller 22 and the TB controller 28. When determining the RB and TB controllers 22 and 28 to be ready, in step S16 of FIG. 3B, the transfer controller 29 outputs the number of words to be transferred in the first transfer cycle to the RB and the TB controllers 22 and 28 as the initial value in step S18. The initial value is five if the three low-order bits of the transfer starting address is, for example, "011". The initial value is eight, which corresponds to the storage capacity of the RB 20, in transfer cycles other than the last transfer cycle. In the last transfer cycle, the initial value is dependent on the number of remaining words to be transferred.

The RB controller 22 generates and outputs the ready signal to the transfer controller 29 when the RB 20 is set at a ready state. The RB controller 22 waits for the receive start instruction to be entered thereinto in step S30 of FIG. 3C. Upon receipt of the receive start instruction, the RB controller 22 sets the RB 20 in the write mode in step S32. The initial value "011" is set in the BAC 21-1 in accordance with the initial value "5" from the transfer controller 29. Subsequently, the RB controller 22 awaits reception of response information in step S34. The TB controller 28 generates and outputs the ready signal to the transfer controller 29 when the TB 23 is set at a ready state. The TB controller 28 waits for the transfer start instruction to be entered thereinto in step S52 of FIG. 3D. Responsive to the transfer start instruction, the TB controller 28 sets TB 23 in the write mode in step S54. As a result, the SEL 104 selects the address from the BAL 27 for application to the TB 23. Also, data "5" is set in the RC 28-2 in accordance with the initial value "5" from the transfer controller 29. Afterward the TB controller 28 enters a wait state until a count down signal is received.

After providing the initial value to the RB and TB controllers 22 and 28 in step S18, the transfer controller 29 generates and provides an address generate instruction to the DMAC 11. The address generate instruction is executed for one transfer cycle in steps S20 to S24 so that memory addresses are output from the MAC 12 to the MAR 14. That is, a check is made to determine whether or not the count of MWC 13 is "0", in step S20. When "0", step S26 is carried out. If not "0" in step S20, then step S22 is carried out to determine whether or not the contents of MAC 12, i.e., the three low-order bits of the memory address are "111". If Y in step S22, step S16 is carried out again. If N in step S22, that is, when the three low-order bits of the memory address are not equal to "111", then step S24 is carried out.

In step S24, the memory address held by the MAC 12 in the DMA 11 is output to the MAR 14 to be held thereby. The memory address held by the MAR 14 is applied to the address bus 31 of the system bus 30 through the driver 15. At the same time, the 7-bit SID including the 4-bit device identifier BID held by the register 102 and the three low-order bits of the memory address held by the MAR 14 serving the AID is sent onto the SID bus 33 through the driver 16. That is, memory read request information containing the read memory address and the SID is output to the main storage device 4. Subsequently, the MAC 12 is incremented by one, while the MWC 13 is decremented by one. Step S20 is then carried out again.

The processes from steps S20 to S24 are continued until the determination of "YES" is obtained in step S22 and thereby a maximum of eight memory read request information are issued to the main storage device 4. When a determination of "YES" is obtained in step S22, step S16 is carried out for preparation of the next transfer cycle.

Figure 3C:
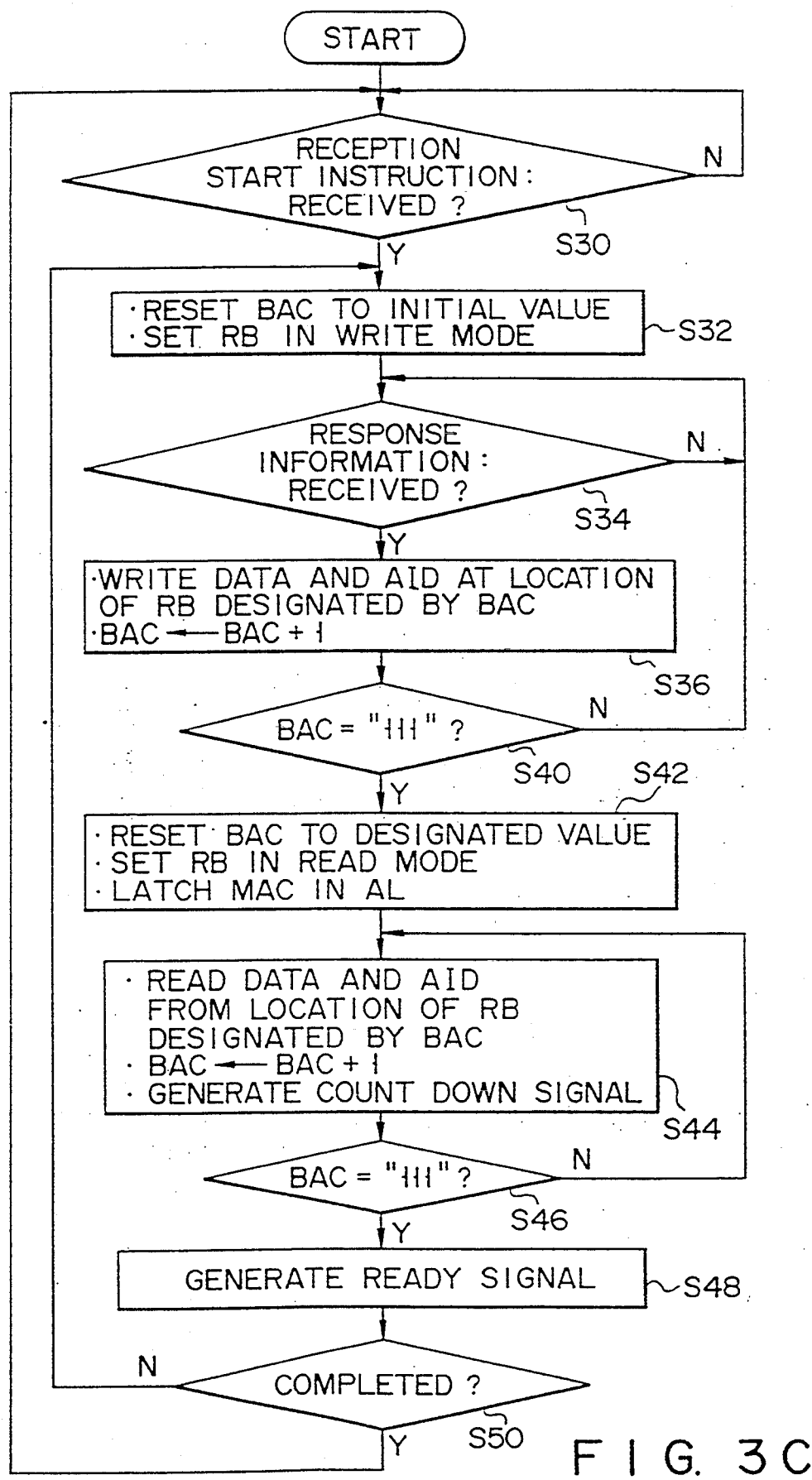

In step S34 of FIG. 3C, the RB controller 22 waits for response information to be entered from the main storage device 4. The MCU 8 of the main storage device 4 receives the memory read request information sent from the channel apparatus 7 via the system bus 30 and holds the SID contained in the request information in the register 8-1. Also, the MCU 8 reads data from a memory bank designated by the memory address contained in the request information. The SID held by the register 8-1 is output onto the DID bus 34 as the DID. Concurrently, the read data is output onto the data bus 32. Assuming the device identifier in the DID at this point to be CID, the DID will contain the CID and the AID. In the manner described above, the response information containing the read data and the DID is output onto the system bus 30 in response to the memory read request information.

When the response information is received, the read data on the data bus 32 is supplied to the RB 20 by the receiver 17. The DID on the DID bus 34 is received by the receiver 18. The AID constituting the three low-order bits of the received DID, i.e., the three low-order bits of the memory read address is also applied to the RB 20, while the CID constituting the 4 high-order bits of the DID is applied to the CMP 19. The CMP 19 compares the CID with the BID held in the register 102. When a coincidence occurs, the CMP 19 issues a coincidence signal to the RB controller 22. Responsive to the coincidence signal, the RB controller 22 allows the read data and the AID to be written into the RB 20. The pair of the read data and the AID are stored in a word location within the RB 20 designated by the BAC 21. Note that the order of return of the response information does not always correspond to the order of generation of memory read request information. Subsequently the BAC 21 is incremented by one.

In step S40, a check is made to determine whether or not the contents of the BAC 21 coincide with "111". When NO in step S40, step S34 is carried out again in order to store pairs of the read data and the AID up to eight in the RB 20. On the other hand, when YES in step S40, i.e., when the contents of the BAC 21 are "111", step S42 is carried out so that the contents of the BAC 21 is reset to a value determined by the initial value from the transfer controller 29, that is, to "001" in the present case. Also, the RB 20 is set in the read the mode. Further, the RB controller 22 produces a latch control signal so that the contents of the MAC 12 are latched by the AL 26.

In steps S44 and S46, pairs of read data and AID are read in sequence from the RB 20. That is, a pair of read data and AID is read from a location of the RB 20 designated by the BAC 21 in step S44. The read data is applied to the TB 23, while the AID is applied to the BAL 27. The AID is latched by the BAL 27 along with the N-bit address latched by the AL 26 to form a buffer address. Since the TB 23 is in the write mode, an output from the BAL 27 is applied to the TB 23 through the SEL 104. Hence, the read data from the RB 20 is stored in a location of the TB 23 that is designated by the output from the BAL 27. Subsequently the BAC 21 is incremented by one and a countdown signal is generated concurrently therewith. The countdown signal is output to the TB controller 28. In step S46, a check is made to determine whether or not the content of the BAC 21 coincides with "111". If NO in step S46, then step S44 is carried out again so as to read data. The above operations are carried out repeatedly until RB 20 enters the EMPTY state. If YES in step S44, then step S48 is carried out so that a ready signal is applied to the transfer controller 29. Subsequently, in step S50, a determination is made, by use of a counter (not shown), as to whether or not the reception of all the response information associated with the output command has been completed. If not completed, step S32 is carried out again. If completed, on the other hand, step S30 is carried out.

When the countdown signal is entered in step S56, the RC 28-2 and the TWC 28-1 are each decremented by one in step S58. In step S60, a check is made to determine if the contents of the TWC 28-1 coincides with "0". If Y in step S60, step S66 is carried out. In the present case the answer is NO in step S60 and thus step S62 is carried out to determine if the contents of the RC 28-2 is "0". If NO in step S62, step S56 is carried out again. If YES in step S62, on the other hand, then a ready signal is applied to the transfer controller 29 in step S64. As a consequence, the next address generation cycle is initiated.

When YES in step S20 in the last address generation cycle, that is, when the contents of the MWC 13 is "0", step S26 is performed to wait for a DONE notice to be entered. The response information for memory read request information in the last address generation cycle is entered and a pair of read data and an AID is stored in the RB 20. When pairs of the read data and the AID are read in sequence in the above manner, a determination is made, in step S50, that all the processes have been completed and the flow then returns to step S30. In step S60 of FIG. 3D, a determination is made that the content of the TWC 28-1 is "0" and step S66 is then carried out. In step S66, a DONE notice is generated which is supplied to the transfer controller 29. Responsive to the DONE notice, the transfer controller 29 generates and supplies a request information completion notice to the CPU 100.

Responsive to the request information completion notice, the CPU 100 generates a data output instruction and supplies it to the TB controller 28 in step S8. Upon receipt of the data output instruction in step S68, the TB controller 28 sets the TB 23 in read mode and generates read addresses in sequence in step S70. The sequence of addresses is selected by the SEL 104 for application to the TB 23. In step S72, the read data from the TB 23 is latched by register 24 in sequence and then supplied to the disk drive unit 6 through the driver 25. When all the read data stored in the TB 23 are read, the TB controller 28 generates and supplies a data output completion notice to the CPU 100 in step S74. Upon receipt the data output completion notice in step S10, the CPU 100 determines all the processes for the output command from the CPU 2 to have been completed. Then the flow returns to step S2.

As can be seen from the foregoing, the AID corresponds with the contents of the three low-order bits of the memory address for the corresponding memory read data. Accordingly, by using the AID as the three low-order bits of an address designating a word location in the TB 23, the memory read data can be rearranged in ascending order of addresses in the TB 23 even if the read data are not returned from the MCU 8 in the order of requests (in ascending order of addresses) issued from the channel apparatus 7. When the RB 20 enters the EMPTY state as a result of consecutive transfer of data from the RB 20 to the TB 23, the transfer controller 29 resumes generation of memory read request information.

In FIG. 4, there is illustrated a block diagram of a second embodiment of the channel apparatus of the present invention including the transfer sections 40 and 40'. In FIG. 4, the same parts as those of FIG. 2 are denoted by the same reference characters and descriptions thereof are omitted. With the embodiment of FIG. 2, as opposed to the prior art, memory read request information can be issued consecutively. But, when the RB 20 is filled up, succeeding memory read request information cannot be issued before the contents of the RB 20 are transfer to the TB 23. In other words, a wait state occurs until the RB 20 becomes empty. The second embodiment shown in FIG. 4, therefore, aims at prevention of the occurrence of such a wait state as far as possible as described below.

By reference to FIG. 4, a description will be made of only portions of the data transfer section 40 which are different from the data transfer section 10 shown in FIG. 2. In place of the RB 20 with a storage capacity of eight words and the RB controller 22 in FIG. 2, the second embodiment of the channel apparatus 7 uses a RB1 50-1 and a RB2 50-2, each having a storage capacity of four words, and a RB controller 52. In place of a latch (AL) 26, latches (AL1) 56-1 and (AL2) 56-2 are used. The AL1 and AL2 correspond to the RB1 the 50-1 and the RB2 50-2, respectively. In addition, a transfer controller 59 is provided instead of the transfer controller 29 shown in FIG. 2.

The RB controller 52 controls the RB1 50-1 and the RB2 50-2 in the same manner as the first embodiment. When determining that response information is addressed to the channel apparatus 7 by means of a coincidence signal from the CMP 19, the RB controller 52 writes a pair of read data and AID into either the RB1 50-1 or the RB2 50-2 that is designated by the MSB (most significant bit) of the AID from the driver 18. The RB controller 52 has buffer address counters (BAC1) 51-1 and (BAC2) 51-2. The address into which a pair of read data and AID is to be written is designated by the BAC1 51-1 or the BAC2 51-2. The same is true of reading process. When pairs of read data and AID up to four are written into either the RB1 50-1 or the RB2 50-2, the RB controller 52 executes processes of transferring data from the receive buffer into which the pairs up to four have been written, to the TB 23 and rearranging the data. At this point one of AL1 56-1 and the AL2 56-2 that corresponds to the receive buffer is used. Writing pairs of read data and AID into the other receive buffer is continued.

The transfer controller 59 controls the DMAC 11 so as to generate up to eight addresses in the first address generation cycle. More specifically, when processes of transferring data from a receive buffer into which the pairs up to four have been written, to the TB 23 and rearranging data are terminated, the transfer controller 59 controls the DMAC 11 so as to generate next four addresses.

Figure 5A:
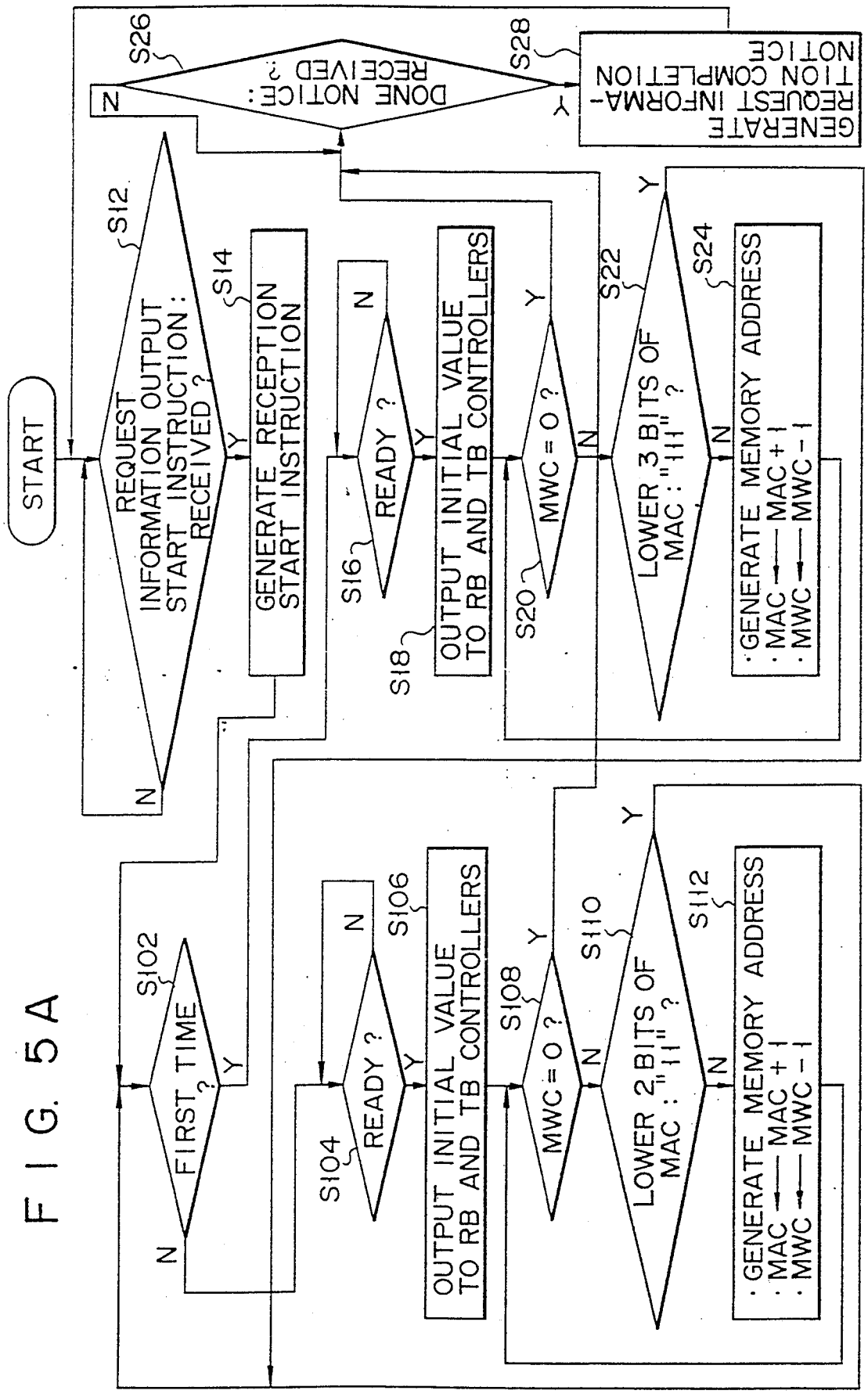
FIGS. 5A and 5B are flowcharts illustrating the operation of the second embodiment.
Figure 5B:
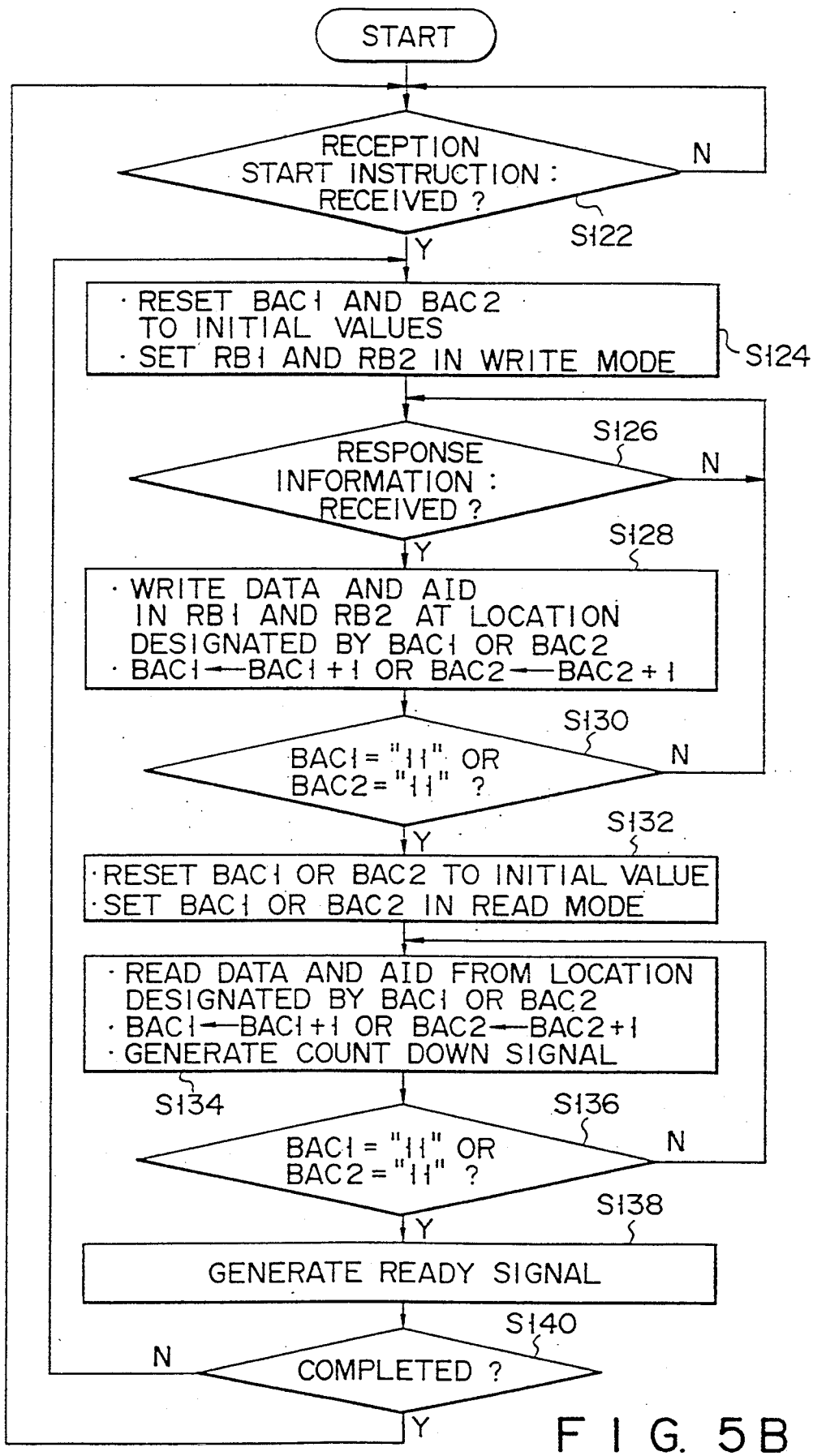

The operation of channel apparatus 7 according to the second embodiment will be described below with reference to FIGS. 5A and 5B. In flowcharts of FIGS. 5A and 5B, the same portions as those of the flowcharts of the first embodiment are designated by the same characters and descriptions thereof will be omitted.

Upon receipt of a request information output start instruction, the transfer controller 59 determines, in step S102, if the address generation cycle is the first one. If YES in step S102, addresses are generated up to eight for application to the MAR 14 in steps S18 to S24. When receiving a receive start instruction from the transfer controller 59 in step S122, the RB controller 52 sets, as with the first embodiment, a value corresponding to the initial value in the BAC1 51-1 and the BAC2 51-2. Also, the RB1 50-1 and the RB2 50-2 are placed in the write mode.

When response information corresponding to the generated memory read request information is received, read data and DID contained in the response information are entered into channel apparatus 7 through the receivers 17 and 18, respectively. The CID contained in the DID entered into channel apparatus 7 is compared with the BID held in the register 102 by the CMP 19. The result of the comparison in the CMP 19 is supplied to the RB controller 52 along with the MSB of the AID contained in the DID. When a coincidence occurs in the CMP 19, the RB controller 52 allows writing into one of the RB1 50-1 and the RB2 50-2 that is designated by the MSB of the AID. Consequently, a pair of read data entered by the receiver 17 and the AID in the DID entered by receiver 18 is stored in a location designated by the BAC1 51-1 or the BAC2 51-2. It is assumed here that a pair is written into the RB1 50-1 when the MSB of the AID is "0". If the MSB of the AID is "0", then the BAC1 51-1 is decremented by one and a check is made to determine if the contents of BAC1 51-1 is equal to "11" in step S130. If not equal, namely, if NO in step S130, step S126 is carried out again. If YES in step S130, on the other hand, then step S132 is carried out. In view of the first address generation cycle, the contents of the MAC 12 of the DMAC 11 is latched by the AL1 56-1 and the A12 56-2.

In steps S132 to S138, as with steps S42 to S48, pairs of read data and AID stored in the RB1 50-1 are transferred to the TB 23. In this case, the addresses held in the AL1 56-1 are used. During an interval in which the pairs of read data and AID are being transferred from the RB1 56-1 to the TB 23, pairs of read data and AID in response information being received are stored in the RB2 50-2 under the control of the RB controller 52. A ready signal is generated in step S138 when up to four pairs have been alternatively read from the RB1 50-1 or the RB2 50-2, i.e., when up to four pairs have been read from the RB1 50-1 subsequent to the RB2 50-2 or from the RB2 50-2 subsequent to the RB1 50-1.

In the address generation cycles after the first address generation cycle, since NO in step S102, step S104 is carried out. Steps S104 to S112 are similar to the steps S16 to S24, but different only in that a check is made, in step S110, to determine if the two low-order bits of the content of the MAC 12 is "11". That is, up to four addresses are generated in the address generation cycles subsequent to the first address generation cycle.

When four pairs of read data and AID are stored in the RB2 50-2, the address held in the MAC 12 except for the three low-order bits is latched by the AL1 56-1. Subsequently the pairs of read data and AID stored in the RB2 50-2 are transferred to the TB 23 as in the case where the pairs stored in the RB1 50-1 were transferred to the TB 23.

In this way, the read data contained in response information are stored in an empty one of the RB1 50-1 and the RB2 50-2 and then transferred to the TB 23 to be rearranged using addresses which are alternately latched by the AL1 56-1 and the AL2 56-2. The addresses are generated up to eight in number in the first address generation cycle, while four addresses are generated in each of the subsequent address generation cycles.

According to the second embodiment described above, by the provision of two receive buffers, memory read request information can be transmitted consecutively four times (except for the start and termination address generation cycles) even in a system which is considerably slow in response from a memory control unit in a main storage device. Moreover, even if memory read data are not returned from the memory control unit in the order of the memory read request information issued from the channel apparatus, they can be rearranged in the ascending order of memory addresses in the transmit buffer.

In the second embodiment, two receive buffers are provided. Alternatively, by provision of still more receive buffers, the number of consecutive transmissions of memory read information may be further increased in a system which is considerably slow in response from a memory control unit of a main storage device. In this case, assuming that four receive buffers of the same structure as receive buffer 50-1 are provided, it is required only that the four low-order bits of a memory address be used as a within-device ID (address identifier AID) and one of the receive buffers to be written into be designated by the two high-order bits of the AID.

Also, in the second embodiment, four addresses are generated in each of address generation cycles following the first one. Alternatively, eight addresses may be generated after all the read data responding to the issued memory read request information are stored in the RB1 and RB2 and then transferred to the TB. In this case, read data is transferred from a receive buffer which has first received four read data to the transmit buffer. With such an arrangement used, eight addresses may be generated in each address generation cycle, facilitating the control of the transfer controller.

What is claimed is:

1. A channel apparatus in a data processing system, the data processing system also including main storage means for storing data, command means for outputting commands, and alternate storage means for storing data, the channel apparatus transferring data from the main storage means to the alternate storage means in response to commands from the command means, the channel apparatus comprising:

control means responsive to a command input thereto, for generating a transfer instruction;

updating means for generating memory addresses of the main storage means based on the transfer instruction;

request information generating means responsive to the transfer instruction for consecutively generating a predetermined number of read request information units, each of the read request information units including a memory address from the updating means and a source identifier, the source identifier including a device identifier and a within-device identifier, the device identifier identifying an alternate storage means, and the within-device identifier identifying a relative order in which the read request information unit was generated;

receiving means for sequentially receiving a plurality of response information units output from the main storage means in response to the read request information units, each received response information unit corresponding to a read request information unit, each of the response information units including data and a destination identifier, the destination identifier including the device identifier and the within-device identifier of the corresponding read request information unit; and rearranging means for rearranging the received data from the plurality of response information units in the order of generation of the corresponding read request information units on the basis of the order indicated by the received within-device identifiers in the received response information units, so as to transfer the plurality of data to the alternate storage means in the order of generation of the read request information units.

2. An apparatus according to claim 1, wherein the receiving means includes receive buffer means for storing the received response information units, the buffer means having a storage capacity corresponding to the predetermined number of the response information units.

3. An apparatus according to claim 1, wherein the receiving means includes:

receive buffer means for storing received response information units, and receive control means for storing the received data and the received within-device identifiers in the received response information units in the receive buffer means in accordance with the received device identifiers in the received response information units and for reading the stored data and the stored within-device identifiers from the receive buffer when the predetermined number of response information units are received; and wherein said rearranging means includes:

transmit buffer means for holding the rearranged data, and transmit control means for storing the predetermined number of data read-out from the receive buffer means in the transmit buffer means in accordance with addresses of the transmit buffer means, and for generating the addresses of the transmit buffer means based on the memory addresses from the request information generating means and the within-device identifiers read out of the receive buffer means.

4. An apparatus according to claim 1, wherein said receiving means includes:

receive buffer means having at least first and second receive buffers of the same storage capacity, the storage capacity of all the receive buffers being sufficient to receive the received response information units, and receive control means for storing the received data and the received within-device identifiers in the received response information units in the first receive buffer in accordance with the received device identifiers and the received within-device identifiers in the received response information units, and for reading, when the predetermined number of data and within-device identifiers are stored in said first receive buffer, the stored data and the stored within-device identifiers therefrom; and wherein said rearranging means includes:

transmit buffer means for holding the rearranged data, and transmit control means for storing the data read-out from the first receive buffer in the transmit buffer means in accordance with addresses of the transmit buffer means, and for generating the addresses of the transmit buffer means based on the memory addresses from the request information generating means and the within-device identifiers read out of the receive buffer means.

5. An apparatus according to claim 4, wherein the receive control means stores the received data and the received within-device identifiers in the received response information units in the second receive buffer when the stored data and the stored within-device identifiers are read out from the first receive buffer.

6. The apparatus according to claim 4, wherein the predetermined number equals the storage capacity of all the receive buffers.

7. The apparatus according to claim 1, wherein the request generating means generates read request information units while the updating means is generating memory addresses.

8. A method of transferring data from a main storage means to alternate storage means in response to commands from a command means in a data processing system, the method comprising the steps of:

generating a transfer instruction in response to a command output from the command means;

generating memory addresses of the main storage means based on the transfer instruction;

consecutively generating a predetermined number of read request information units in response to the transfer instruction, each read request information unit including a generated memory address and a source identifier, the source identifier including a device identifier and a within-device identifier, the device identifier identifying an alternate storage means, and the within-device identifier identifying a relative order in which the read request information unit was generated;

sequentially receiving a plurality of response information units output from the main storage means in response to the read request information units, each received response information unit corresponding to a read request information unit, each of the response information units including data and a destination identifier, the destination identifier including the device identifier and the within-device identifier of the corresponding read request information unit; and rearranging the received data from the plurality of response information units in the order of generation of the corresponding read request information units on the basis of the order indicated by the received within-device identifiers in the received response information units, so as to transfer the plurality of data to the alternate storage means in the order of generation of the read request information units.

9. A method according to claim 8, wherein the predetermined number corresponds to the storage capacity of said receive buffer means.

10. A method according to claim 8, wherein the receiving step includes storing the received response information units in a received buffer means, the buffer means having a storage capacity corresponding to the predetermined number of the response information.

11. A method according to claim 8, wherein the receiving step includes:

storing the received data and the received within-device identifiers in the received response information Units in a receive buffer means in accordance with the received device identifiers in the received response information units, and reading the stored data and the stored within-device identifiers from the receive buffer means when the predetermined number of response information units are received; and wherein the rearranging step includes:

storing the predetermined number of data read-out from the receive buffer means in a transmit buffer means in accordance with addresses of the transmit buffer means, and generating the addresses of the transmit buffer means based on the memory addresses from the request information generating means and the within-device identifiers read out of the receive buffer means.

12. A method according to claim 8, wherein the receiving step includes:

storing the received data and the received within-device identifiers in the received response information units in a first receive buffer of a receive buffer means in accordance with the received device identifiers and the received within-device identifiers in the received response information units, the receive buffer means having at least the first receive buffer and a second receive buffer, each receive buffer being of the same storage capacity, the storage capacity of all the receive buffers being sufficient to receive the received response information units; and reading, when the predetermined number of data and within-device identifiers are stored in the first receive buffer the stored data and the stored within-device identifiers from the first receive buffer; and wherein the rearranging step includes:

storing the data read-out from the first receive buffer in a transmit buffer means in accordance with addresses of the transmit buffer means, and generating the addresses of the transmit buffer means based on the memory addresses from the request information generating means and the within-device identifiers read out of the receive buffer means.

13. A method according to claim 12, wherein the storing step of the receiving step includes storing the received data and the received within-device identifiers in the received response information units in the second receive buffer when the stored data and the stored within-device identifiers are read out from the first receive buffer.

14. A data processing system comprising:
a system bus;
a main memory connected to the system bus and having a plurality of memory banks containing data, the main memory being responsive to read-request information units through the system bus and sending response information units through the system bus, the read-request information units including a source identifier and a memory address to one of the plurality of memory banks, the response information units including the source identifier and data contained in a memory bank corresponding to the memory address;
an alternate memory; and
a channel apparatus connected to the system bus and to the alternate memory, the channel apparatus comprising:
issuing means for consecutively issuing a plurality of read-request information units to the main memory through the system bus so as to read out data from the main memory, a source identifier included in each of the request information units having a device identifier for identifying the alternate memory and a within-device identifier for identifying an issued relative order in which the read-request information units were generated;
receiving means for consecutively receiving from the systems bus a plurality of response information units having device identifiers indicating the alternate memory; and
rearranging means for rearranging a plurality of data included in the received response information units in the order of issuance of the corresponding read-request information units on the basis of the order indicated by the within-device identifiers included in the received response information units, so as to transfer the plurality of data to the alternate memory in the order of issuance of the read-request information units.

15. A method of transferring data from a main memory to an alternate memory through a channel apparatus, the main memory being connected to the channel apparatus through a system bus, the main memory having a plurality of memory banks containing data, the method comprising the steps of:
consecutively issuing a plurality of read-request information units from the channel apparatus to the main memory through the system bus so as to read out data from the main memory, each of the plurality of read-request information units including a source identifier and a memory address to one of the plurality of memory banks, the source identifier having a device identifier for identifying the alternate memory and a within-device identifier for identifying an issued relative order in which the read-request information unit was generated;
consecutively sending from the main memory to the channel apparatus, response information units in response to the read-request information units, the response information units including the source identifier and data contained in a memory bank corresponding to the memory address;
consecutively receiving in the channel apparatus a plurality of response information units whose device identifiers indicating the alternate memory; and
rearranging a plurality of data included in the received response information units in the order of issuance of the corresponding read-request information units on the basis of the order indicated by the within-device identifiers included in the received response information units, so as to transfer the plurality of data to the alternate memory in the order of issuance of the read-request information units.

* * * * *